Patented May 10, 1949

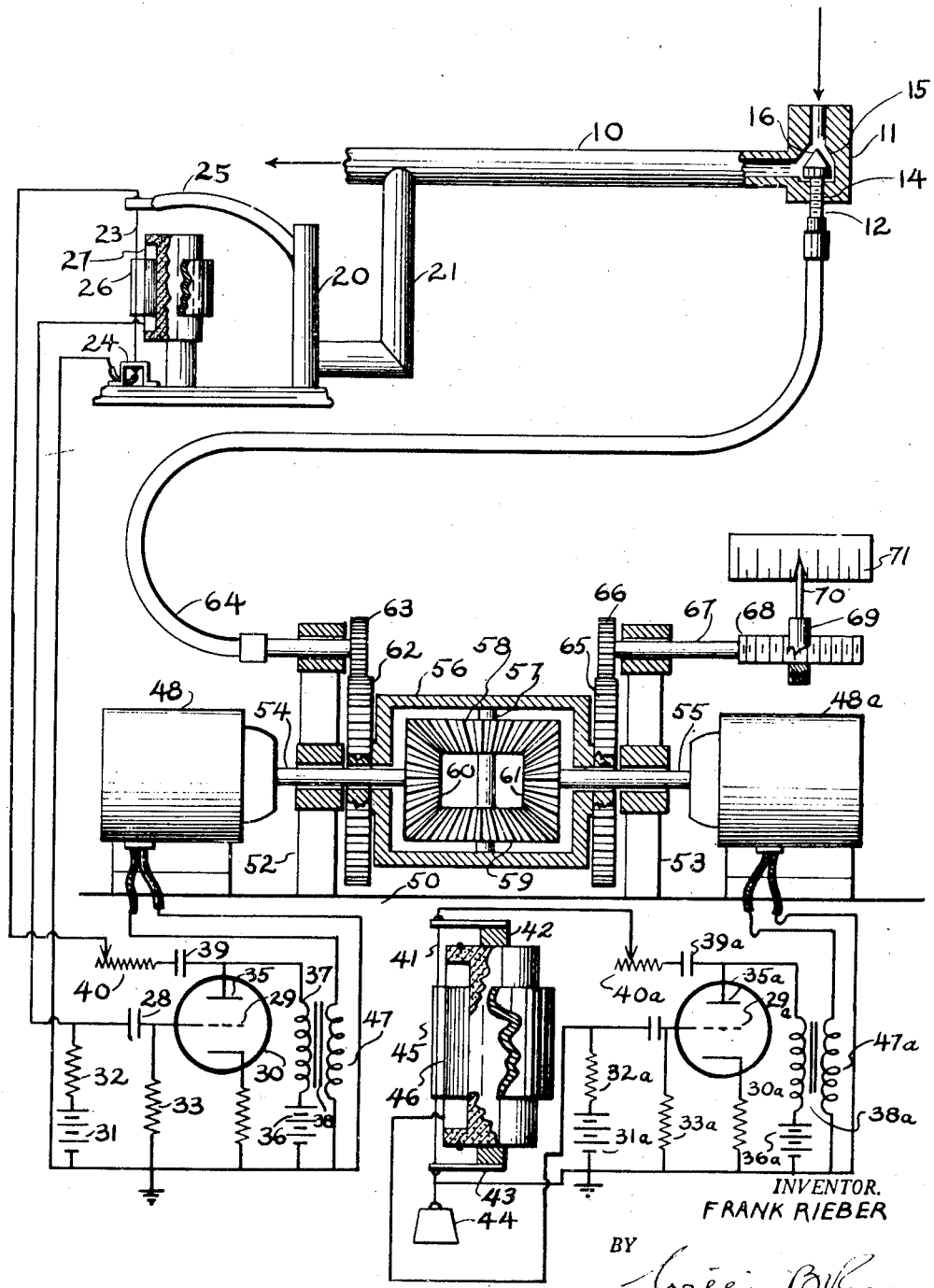

2,469,786

UNITED STATES PATENT OFFICE 2,469,786

ELECTRIC MOTOR CONTROL DEVICE

Frank Rieber, New York, N. Y., assignor to Interval Instruments, Inc., New York, N. Y., a corporation of New York Application May 19, 1944, Serial No. 536,409

7 Claims. (Cl. 318—18)

This invention relates to a control apparatus for maintaining a constant value for any controllable variable quantity. It is an object of this invention to provide an apparatus which will maintain the variable constant within the capacity of the apparatus, regardless of variations in the other factors involved.

In many forms of governing devices an increase in the value of the quantity to be governed produces a change in the control apparatus to counteract that change, but in such cases a small variation in the variable must be permitted, to maintain the control apparatus in its adjusted position. Such an apparatus, therefore, while it greatly reduces changes in the quantity to be controlled, nevertheless by its law of operation must permit a certain minute variation.

It is an object of this invention to provide an apparatus of a new and improved kind which can maintain the quantity at the determined value, bringing it completely back to that determined value after even the smallest change, so that normally no appreciable change can take place, and even in the case of very sudden changes the value is immediately brought back exactly to its determined value.

In certain other types of control apparatus intended to maintain an absolutely constant average value, and to bring the quantity back to that determined value after any variation, the change in value produces a change in the control apparatus which continues, after the correction has been made, long enough to cause an opposite variation in the value, so that there is a tendency of a quantity to fluctuate above and below the determined value, which is commonly called hunting.

It is an object of this invention to provide a control apparatus which is capable of making full and complete correction for any variation, which apparatus nevertheless is free from any tendency to hunt.

Certain control apparatus intended to maintain quantities at predetermined values involve the principle of comparing the variable with a static quantity corresponding to the value to be maintained. Difficulty has been experienced in bringing the variable to be governed into conformity with such a static standard with accuracy and speed and without hunting.

It is an object of this invention to provide a control apparatus adapted to respond to any measurable and controllable variable, and constantly to bring that variable into conformity with the dynamic standard which can be maintained at a fixed value.

As will be clear from the description, the apparatus will accurately control any value which can be accurately measured and controlled. As a simple illustration, I have chosen to describe it as applied to the maintenance of a constant pressure in a pressure system.

The invention accordingly comprises a system possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which the figure shows an apparatus designed to maintain a fixed pressure within a conduit carrying a fluid.

The construction as illustrated comprises a device responsive to the pressure of the fluid to be controlled, a standard for maintaining a fixed value by which the variable, that is the fluid pressure, is to be compared, and a mechanism responsive to the difference between the standard and the pressure responsive means to bring the pressure back to the determined value.

In the drawings, the numeral 10 represents a fluid main having inserted therein a control valve 11 operable by a threaded stem 12 fitting within a stationary nut 14 and adapted to throttle the fluid between a valve seat 15 and a valve body 16, as the stem 12 is turned in the nut 14. The numeral 20 is a pressure gauge connected by a conduit 21 with the fluid main 10, and thus responsive to the pressure in the main at the point beyond the valve 11.

The pressure gauge herein illustrated is more fully described in my copending application for Vibronic pressure meters, filed January 29, 1944, and bearing Serial No. 520,200, now Patent No. 2,455,021. I have chosen to employ it herein as it is at the same time very sensitive and reliable. Briefly, such a gauge comprises a wire 23 stretched between a base 24 and the free end of a pressure responsive device, such as a Bourdon tube 25, so that pressure within the tube will change the tension on the wire and thus change its elastic period of vibration. The wire itself is placed in the field of a permanent magnet 26, and close and parallel to it is a stationary electrode 27.

The electrode 27 is connected through a condenser 28 to the grid 29 of an amplifying system herein shown as a vacuum tube 30. A battery 31 acting through a resistance 32 maintains a potential on the electrode 27. This grid 29 is connected to ground by a suitable grid biasing resistance 33.

The plate 35 of the tube is connected to a plate battery 36 through the primary 37 of a transformer 38, and it is connected to the upper end of the wire 23 through a condenser 39 and feed-back control resistance 40. With this construction the amplifier system will oscillate at a frequency determined by the natural period of the stretched wire 23 which in turn is a function of the tension imposed upon the wire by the Bourdon tube, that is, it is a function of the fluid pressure within the main 10. It will be understood that the wire 23 carries a current which oscillates at the frequency of the oscillator, and thereby causes the wire to vibrate within the magnetic field. This vibration varies the capacity between the wire and the electrode 27, and in this particular embodiment, this change in capacity is used to vary the frequency of the oscillator. It will be understood, however, that this particular form of pick-up constitutes no part of the present invention, but is embodied in the claims of the co-pending application herein referred to.

The apparatus for maintaining a fixed quantity with which to compare the variable comprises a wire 41 supported at its upper end by a frame 42, the lower end being held against lateral movement by an arm 43. The tension on wire 41 is determined by the weight 44 attached to its lower end. This wire, as in the case of the wire 23, is placed in the field of a magnet 45 and parallel to an electrode 46. It is connected to the elements of an amplifier system in the same manner as the wire 23 and the electrode 27. For this reason it will not be necessary again to describe this construction again. We have therefore applied the same reference numerals to corresponding parts, but with the subscript "a."

The secondary 47 of the transformer 38 is connected to drive a synchronous motor 48, and the secondary 47a of the transformer 38a is connected to drive a synchronous motor 48a. The numeral 50 comprises a base or frame carrying a differential gear of any suitable form to which the motors 48 and 48a are connected. As herein illustrated, there is attached to the base 50 a pair of uprights 52 and 53, in which are journaled respectively shafts 54 and 55 of the motors 48 and 48a, the shafts being in alignment with each other about a common axis. Journaled upon the ends of shafts 54 and 55, between the uprights 52 and 53, is a hollow frame 56 in which is mounted a transverse shaft 57 having its axis intersecting the axis of the shafts 54 and 55.

On this shaft 57 there is mounted a pair of oppositely disposed beveled gears 58 and 59 which mesh with the opposite sides of beveled gears 60 and 61 fixed upon the shafts 54 and 55 respectively. With this familiar form of differential, it will be understood that if the shafts 54 and 55 rotate at precisely the same speed, the frame 56 will remain stationary, but if either shaft gains in speed over the other, the frame 56 will rotate about the common axis of the shafts 54 and 55.

Upon one end of the frame 56 is mounted a gear 62 meshing with a pinion 63 connected to a flexible shaft 64, which in turn drives the stem 12. As will be understood, the direction of motion is such that with an increase in pressure in the main, and consequently an increase in the pressure in the wire 23, the motor 48 will speed up and rotate the frame 56 in the direction of motion of the motor 48, and this direction of motion is such as to move the valve body 16 in the direction of the closed valve position.

A gear 65 also on the frame 56 meshes with a pinion 66 fixed on a shaft 67 carrying a screw 68 which is engageable by a nut 69 carrying an indicator 70 over a dial 71, to indicate the amount of movement of the frame 56 required to maintain the pressure within the main 10, and this will indicate the position of the valve body 16, and hence the amount of throttling required in the fluid to maintain the pressure desired. In certain measure, therefore, this will make it possible to reduce the pressure upon the system above the valve in order to minimize the loss of power which serious throttling entails. This indicator also serves the purpose that in the event the pressure in the main above the throttling valve falls to a point where it is inadequate to maintain the desired pressure, then the indicator will move to its extreme position at one end of the scale, and in this position it may cause to operate a warning bell or the like in accordance with well known principles.

It will be clear that whereas I have shown this device applied to the control of fluid pressure, it may in the same manner, within the scope of this invention, control any variable quantity capable of being altered, such for example as temperature electric current or pressure, speed or light value, provided that the variable is capable of control as by controlling a heater, a rheostat steam flow, or in any other way, performing the function illustrated here by the throttle valve, and provided there be some available instrument for determining the value of the variable after it has been controlled, and translating this variation into tension on the wire. For this reason the language of the claims will refer generally to the control of variables, rather than to fluid pressure solely.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebtweeen.

Having described my invention, what I claim as new and desire to secure by Letters Patent is:

1. A device for controlling a quantity, comprising a quantity varying means, an oscillating system including a wire under tension connected to determine the frequency of oscillation and means actuated by the quantity to be controlled for varying the tension on said wire, a second oscillating system including a wire under tension connected to determine its frequency of oscillation, and a differential mechanism operable by the difference in frequency between said oscillating systems, connected to control the value of the quantity varying means in a direction to bring said first mentioned oscillating system to the same frequency as the second mentioned oscillating system.

2. Means for controlling a quantity, comprising a mechanism for varying the quantity, an oscillating system including a vibrating wire and connections to cause said vibrating wire to determine the frequency of oscillation of said oscillating system and connected to have its tension varied as said quantity is varied, a synchronous motor driven by said oscillating system, a fixed speed motor adapted to run at the speed of said first mentioned motor when the quantity has the desired vaue, and a differential mechanism connecting said motors for adjusting the quantity varying means to bring the speed of first mentioned motor to the speed of the fixed speed motor.

3. Means for controlling a quantity, comprising a mechanism for varying the quantity, an oscillating system including a vibrating wire and connections to cause said vibrating wire to determine the frequency of oscillation of said oscillating system and connected to have its tension varied as said quantity is varied, a synchronous motor driven by said oscillating system, a second oscillating system including a vibrating wire and connections to cause the vibration of said vibrating wire to determine the frequency of oscillation, a motor driven by said second oscillating system and differential connections between said motors for varying said quantity adjusting means to bring said first mentioned motor to the speed of the second mentioned motor.

4. A means for controlling a quantity, comprising a mechanism for varying the quantity, a vibratable wire, means responsive to the value of the quantity resulting from such variation for altering the tension on said wire, a synchronous motor and means having its frequency determined by said wire and connected to drive said motor, a fixed speed motor, a differential to which both of said motors are connected, and means operated by said differential for operating said quantity varying means.

5. A means for controlling a quantity, comprising a mechanism for varying the quantity, a vibratable wire; means responsive to the value of the quantity resulting from such variation for altering the tension on said wire; a magnet having its field transverse to said wire, an electrode parallel to said wire, an oscillator connected to pass current through said wire and having its frequency determined by the capacity between said wire and said electrode, a synchronous motor driven by said oscillator, a fixed speed motor, a differential mechanism driven by said motors for operating said quantity varying.means to bring said first mentioned motor to the speed of said fixed speed motor.

6. A device for exactly controlling a variable quantity comprising a control element for that quantity, means for indicating the value of the quantity when so controlled, an oscillating circuit containing a vibrating element connected to determine the frequency of oscillation, a second oscillating circuit including a vibrating body connected to determine the frequency of oscillation, means differentially connecting said sources of alternating current for operating said control element whereby said quantity may be controlled throughout a control range by varying the period of vibration of said second mentioned vibrating element.

7. A device for exactly controlling a variable quantity comprising a control element for that quantity, means for indicating the value of the quantity when so controlled, a wire held under mechanical tension by said indicating means, an oscillating circuit having its frequency of vibration determined by the frequency of said wire, a controllably variable precision source of alternating current, and means for differentially connecting said sources of alternating current for operating said control element, and means for controllably varying the source of alternating current whereby said quantity may be controlled throughout a control range.

FRANK RIEBER.

REFERENCES CITED

The following references are of record in the file of this patent:

UNITED STATES PATENTS

| Number | Name | Date |
| --- | --- | --- |
| 1,907,132 | Thurston | May 2, 1933 |
| 1,934,400 | Bollman | Nov. 7, 1933 |